July 15, 1952  A. F. AMELUNG  2,603,524

HOOK HAVING RELEASABLE SAFETY LOCKING MEANS

Filed Dec. 1, 1948

INVENTOR.
Alexander F. Amelung
BY
ATTORNEY.

Patented July 15, 1952

2,603,524

UNITED STATES PATENT OFFICE 2,603,524

HOOK HAVING RELEASABLE SAFETY LOCKING MEANS

Alexander F. Amelung, Kansas City, Mo.

Application December 1, 1948, Serial No. 62,883

3 Claims. (Cl. 294—83)

This invention has to do with coupling devices of the kind particularly adapted for use with cranes to releasably attach the loop of a chain, a sling or the like member thereto.

The most important object of the present invention is to provide a coupling having an elongated member formed to present a hook on one end thereof, the member being provided with structure slidably mounted thereon capable of moving to and from a position closing the mouth of the hook and thereby embracing a portion of a chain link or other member within the hook.

Another important object of the present invention is to provide a coupling having a bar provided with an inclined recess for receiving a chain loop or the like and slidable means on the bar for releasably locking the loop within the recess, the slidable member being further provided with means serving to eject the chain loop from the recess when the slidable member moves to open the recess.

Other objects of the present invention relate to the way in which a coupling is formed through use of a pair of relatively slidable members; the manner in which the two members are releasably interlocked; the way in which the members are provided with intersecting slots or recesses for receiving a member to be coupled therewith; and the way in which one edge of the slot of one of the members serves to eject the chain loop therefrom.

Other more minor objects will be made clear or become apparent as the following specification progresses, reference being had to the accompanying drawing, wherein.

Figures 1, 2, 3:
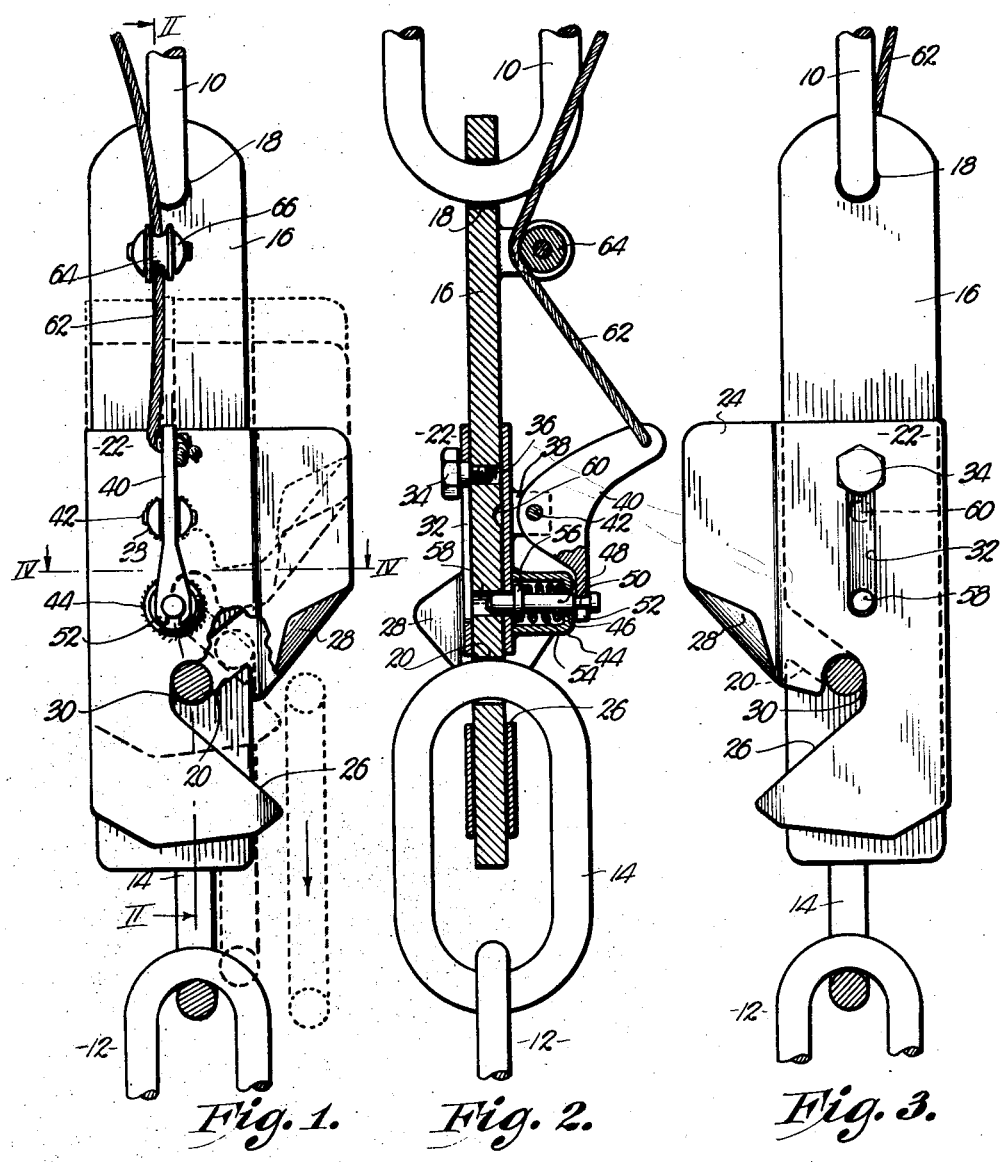
Fig. 1 is a side elevational view of a hook or coupling having releasable safety locking means made in accordance with my present invention.
Fig. 2 is a substantially central, longitudinal, cross sectional view taken on line II—II of Fig. 1.
Fig. 3 is an elevational view showing the side of the coupling opposite to that illustrated in Fig. 1; and, Fig. 4 is a transverse, cross sectional view taken on line IV—IV of Fig. 1, looking in the direction of the arrows.

In Figs. 1 to 3, inclusive, of the drawing, there is illustrated fragmentarily a hook 10 forming a part of a crane or the like that depends from the outermost end of the crane boom in the usual manner. Figs. 1 to 4, inclusive, of the drawing, also, illustrate a chain 12 having a link 14 of elongated character at one end thereof.

Manifestly, the members to be joined by the coupling about to be described is of no particular moment, and it is contemplated that the coupling hereof be capable of many other applications. For instance, on smaller scales, this coupling could be used as an interconnecting means for ends of tire chains or even as a part of a wrist watch strap or band with but slight modifications.

The coupling, per se, includes an elongated, flat bar 16 having an opening 18 near one end thereof for receiving the hook 10 in looped relationship thereto. One longitudinal edge of the bar 16 has formed therein intermediate the ends thereof an elongated slot 20 disposed with its longitudinal axis at an angle to both the longitudinal and transverse axes of the bar 16. In other words, the slot or recess 20 is inclined away from the opening 18 of bar 16 as the innermost end of the recess 20 is approached.

A sleeve broadly designated by the numeral 22 completely circumscribes the bar 16 for free, sliding movement thereon. One edge of the sleeve 22 proximal to that edge of the bar 16 having recess 20 formed therein is provided with an outwardly-extending portion 24 that terminates at its lowermost end adjacent an elongated slot 26 formed near the lowermost end of the sleeve 22.

The lowermost end of the extension 24 is provided with opposed, outwardly-extending wings 28 that are bent back slightly in overlapping relationship to the extension 24 itself as the outermost ends of the wings 28 are approached. The two side walls of the sleeve 22 are both cut away to define the slot 26 which is inclined inwardly in a direction opposite to and intersecting the direction of inclination of the recess 20.

The innermost end of the slot 26 is provided with a portion 30 having its longitudinal axis substantially parallel with the longitudinal axes of sleeve 22 and bar 16. One face of the sleeve 22 is provided with a longitudinal, elongated slot 32 near the uppermost end thereof through which passes a screw 34 having a head that is of greater diameter than the width of the slot 32. This screw 34 is threaded within an internally-tapped opening 36 formed in the bar 16.

The opposite face of the sleeve 22 has a bifurcated boss 38 for pivotally receiving a trigger 40 through the medium of a shaft 42 that pivotally interconnects trigger 40 with the boss 38. Spaced inwardly from the boss 38 on the same face of sleeve 22 therewith is an upstanding cylinder 44 that is open at that end thereof next adjacent sleeve 22 and provided with an opening 46 in its outermost end for slidably receiving a pin 48.

The outermost end of the pin 48 is provided with a portion 50 of reduced diameter for receiving bifurcated end 52 of the trigger 48. A spring 54 in cylinder 44 is coiled about the pin 48 and bears against a shoulder 56 on the pin 48 for yieldably holding the latter at the innermost end of its path of travel.

In addition to the opening 36 in bar 16, there is provided an opening 58 and a recess 60 in bar 16 for receiving the innermost end of the pin 48 in the manner illustrated in Fig. 2 of the drawing. A cable 62 has one end thereof secured to the trigger 40 on one side of the boss 38 opposite to the bifurcations 52. This cable 62 is trained under a pulley 64 rotatably mounted on a bifurcated bracket 66 that is, in turn, fixed to bar 16 immediately inwardly from the opening 18.

Figure 4:
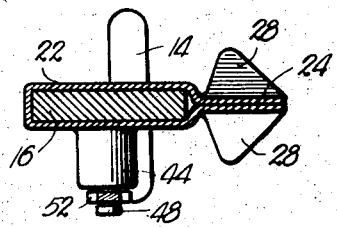

In operation, when the sleeve 22 is in the position shown by full lines in Fig. 1 and, also, in Figs. 2 and 4, inclusive, such sleeve 22 completely covers the mouth of the recess 20 with the link 14 of chain 12 embraced therein. Specifically, the link 14 is at the innermost end of the recess 20 and within that portion 30 of the inclined slot 26 of sleeve 22.

With the pin 48 disposed in the opening 58 of bar 16, sleeve 22 is positively locked against sliding movement on bar 16, and the link 14 is held in position and against displacement from the slot 20.

The pulling action upon the cable 62 will release pin 48 from the opening 58, permitting sliding movement of sleeve 22 toward the opening 18. As the cable 62 is continued to be pulled, the longitudinal edges of slot 26 will bear against loop 14 causing the same to slide outwardly in the recess 20 until such loop 14 is released entirely from connection with bar 16.

Releasing of the cable 62 at this point in the operation will permit pin 14 to enter the opening 36 by virtue of the action of coil spring 54. Permitting of the sleeve 22 to slide away from the opening 18 to a point where pin 48 will enter recess 60 places the slots 20 and 26 in direct registering relationship where the loop 14 of chain 12 can be inserted in the recess 20.

When such movement of the loop 14 into recess 20 takes place, the extension 24 and particularly wings 28 thereof will serve to guide link 14 into place within recess 20. If a load is being carried by the chain 12, cable 62 may be connected to a winch forming a part of the crane with which the coupling is used capable of lifting such load when the sleeve 22 is caused to move on bar 16 toward the end thereof having opening 18.

While one modification only of the present invention has been illustrated and described, such changes and alterations thereto as might fairly come within the scope of the appended claims are contemplated hereby.

Having thus described my invention, what I claim as new and desire to secure by Letters Patent is:

1. A hook comprising an elongated bar adapted for attachment to a support at one end thereof and having an oblique slot extending toward the opposite end thereof; a sleeve on the bar and slidable longitudinally thereof, said sleeve having an oblique slot extending toward said one end of the bar; a laterally extending portion on said sleeve; and a pair of opposed wings on said portion, said wings being inclined in the same direction as the slot in the bar and extending outwardly beyond the slot in the sleeve, presenting a guide for facilitating insertion of a loop into the slot of the bar.

2. A hook comprising an elongated bar adapted for attachment to a support at one end thereof and having an oblique slot extending toward the opposite end thereof; a sleeve on the bar and slidable longitudinally thereof, said sleeve having an oblique slot extending toward said one end of the bar; a spring-loaded, locking pin reciprocably carried by the sleeve, said bar having an opening for receiving the pin; and a trigger swingably mounted on the sleeve and engaging the pin for retracting the latter from the opening.

3. A hook comprising an elongated bar adapted for attachment to a support at one end thereof and having an oblique slot extending toward the opposite end thereof; a sleeve on the bar and slidable longitudinally thereof, said sleeve having an oblique slot extending toward said one end of the bar; a spring-loaded, locking pin reciprocably carried by the sleeve, said bar having an opening for receiving the pin; a trigger swingably mounted on the sleeve and engaging the pin for retracting the latter from the opening; and a cable connected with the trigger for swinging the latter and shifting the sleeve toward said one end of the bar to force said loop out of the slot of the bar.

ALEXANDER F. AMELUNG.

REFERENCES CITED

The following references are of record in the file of this patent:

UNITED STATES PATENTS

| Number | Name | Date |
|---|---|---|
| 1,130,613 | Klock | Nov. 2, 1915 |
| 1,332,784 | Warlick | Mar. 2, 1920 |
| 1,576,197 | Kuffel et al. | Mar. 9, 1926 |
| 2,295,021 | Weiss | Sept. 8, 1942 |